(No Model.)
T. K. PARRISH.
MANUFACTURE OF WOODEN VESSELS.
No. 518,158. Patented Apr. 10, 1894.
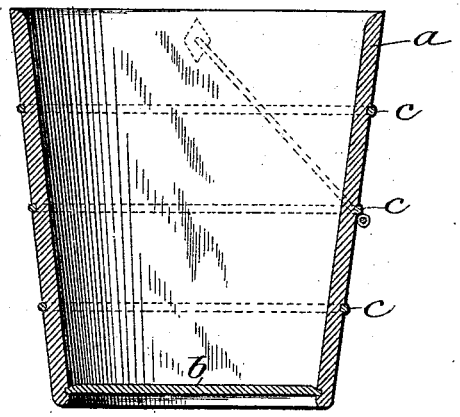
Fig. 1.
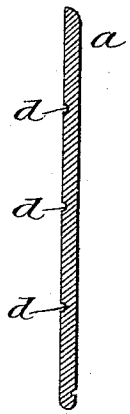
Fig. 2.
Fig. 3.
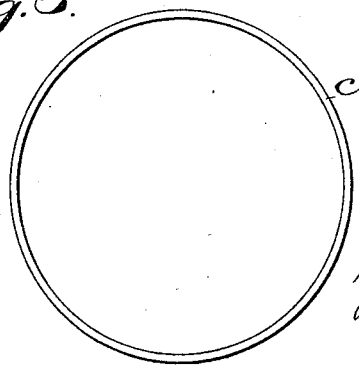
Witnesses:
J. B. McGivr.
G. M. Copenhaver.
Inventor:
T. K. Parrish
By Connolly Bros
Attorneys

UNITED STATES PATENT OFFICE.

THOMAS KIRKPATRICK PARRISH, OF RICHMOND, VIRGINIA.

MANUFACTURE OF WOODEN VESSELS.

SPECIFICATION forming part of Letters Patent No. 518,158, dated April 10, 1894.

Application filed December 23, 1893. Serial No. 494,538. (No model.)

*To all whom it may concern:*

Be it known that I, THOMAS KIRKPATRICK PARRISH, a citizen of the United States, residing at Richmond, in the county of Henrico and State of Virginia, have invented certain new and useful Improvements in the Manufacture of Wooden Vessels; and I do hereby declare the following to be a full, clear, and exact description of the invention, such as will enable others skilled in the art to which it appertains to make and use the same.

This invention has relation to the manufacture of coopered vessels, such as pails, tubs and the like, and has for its object the provision of a novel method of hooping such vessels, and the production, as a new article of manufacture, of a hooped vessel, having the characteristic features hereinafter described.

In Letters Patent of the United States, No. 448,990, granted to me the 24th day of March, 1891, I have shown, described and claimed a method of hooping coopered vessels, that is, wooden vessels composed chiefly of staves, in which the staves, after being assembled, are grooved circumferentially, to receive the hoops, and are then compressed in the vicinity of the grooves, after which the hoops are passed over the body of the vessel and into the grooves, and then the pressure relieved and the vessel allowed to expand and tighten the hoops. The hoops used in this case are flat or band hoops, having the ends of the hoop strip riveted together. I have found that, if hoops of proper size, strength and shape are used, and especially if wire, seamless hoops are employed the compression of the vessel by means of a press, such as shown and described in the patent is unnecessary and that the hoops themselves may be employed for the purpose of compressing the staves in the vicinity of the grooves, sufficiently to admit the hoops; I have also found that by using such hoops, the vessels may be hooped more rapidly and economically than heretofore, and that the vessels themselves possess greater strength and stability than vessels hooped according to the methods heretofore employed.

My invention accordingly consists, first, in the method of hooping a coopered vessel, by assembling the staves, grooving them to receive the hoops, and then forcing the hoops over the body and into the grooves. Second, in the method of hooping coopered vessels, by assembling the staves cutting therein a concave or semi-cylindrical groove, and then forcing over the body of the vessel and into the groove a seamless or jointless wire or round metal hoop. Third, in the method of hooping coopered vessels by assembling the staves, cutting or forming a circumferential groove in the body so formed, and then forcing over the body and into the groove an electrically welded metal hoop of round wire. Fourth, in the provision as a new article of manufacture, of a coopered vessel, circumferentially grooved, and embraced by round, seamless or jointless wire hoops forced into the groove or grooves.

In the accompanying drawings, Figure 1 is a vertical central section of a coopered vessel made in accordance with my invention. Fig. 2 is a vertical sectional view of a grooved stave. Fig. 3 is a plan view of a seamless, round wire hoop.

For the purposes of my invention I employ round wire, as the material for the hoops, and preferably unite the ends of the wire, to form a seamless or jointless hoop, by any of the known electric welding processes, as hoops so welded are exceptionally high in tensile strength and less liable to fracture at the weld than hoops otherwise made. The staves of the vessel are assembled in the usual or any convenient way, and held in place temporarily by means of an iron templet or gathering hoop. The groove or grooves for the reception of the hoop or hoops are then cut in the periphery of the vessel, such groove being concave to correspond to the shape of the hoop in cross section. The vessel is then placed in a suitable hooping machine or holder and the hoop put on over the small or bottom end, and, by means of a driver is forced over the staves, and into the groove. The pressure put upon the hoop in forcing it into place, is sufficient to compress the staves, so that the hoop will find an entrance to the groove. The staves being then relieved of pressure by the lodging of the hoop, expand and effect a tightening of the hoop.

In the drawings A, designates the body of a wooden vessel composed of staves $a, a$, bottom $b$, and round wire hoops $c, c$, the latter being fitted or inserted in the semi-circular grooves $d, d$, cut circumferentially in the outer surface of the staves after the same have been assembled and preparatory to the application of the hoops.

I am aware that it is not new to hoop a coopered vessel with round wire welded hoops, but such welded hoops have heretofore been fastened to the vessels to which they have been applied by indenting the hoops at intervals, after they have been put in position on the vessel, the indented portions being compressed or embedded in the wood without previous indentation or grooving of the wood and without so compressing or compacting the staves that when the staves were allowed to expand they would hold the hoop in position. Where welded round wire hoops have heretofore been used the hoop has been put on in the ordinary way without any attempt to use the hoop as a means of compressing the staves beyond their normal position in the assembling machine, the hoops being simply slipped over the small end of the vessel and adjusted to their proper position and indented as before described to secure their retention. According to my invention as hereinbefore described it is absolutely necessary that the staves should be very much compressed in order to enable the hoops to reach their seats in the grooves and when so seated the hoop is perfectly circular in outline and hence cannot be expanded or loosened by any expansion of the vessel, whereas when the hoop has been indented at intervals to retain it in position any expansion of the vessel sufficient to restore the hoop to its original circular outline must result in the hoop dropping off the vessel when the latter contracts to its normal size.

Having described my invention, I claim as new and desire to secure by Letters Patent—

1. The method of hooping coopered or staved vessels which consists in forming a groove in the vessel for the reception of the hoop, forcing on the vessel and into said groove a metallic hoop—and causing said hoop while being so forced to compress the staves and sufficiently diminish the diameter of the groove to admit the hoop.

2. The method of hooping coopered or staved vessels which consists in forming a circumferential, concave groove in the vessel, and then forcing over the vessel a round wire hoop, said hoop being caused to compress the staves, while being so forced, sufficiently to gain entrance to the groove.

3. The method of manufacturing staved wooden vessels which consists in forming continuous circumferential grooves on the outside of the vessel and then forcing a round wire welded hoop of less diameter than the part of the vessel adjacent to the grooves upon the vessel with such force as to compress the vessel sufficiently to allow the hoop to seat in the groove.

4. A staved wooden vessel having a welded wire hoop seated in a continuous circumferential groove, the material at the lower edge of the groove being compressed and the hoop applied after its ends have been welded together.

In testimony whereof I affix my signature in presence of two witnesses.

THOMAS KIRKPATRICK PARRISH.

Witnesses:
EDWARD GRAHAM,
JOHN MORRISON.